(12) United States Patent
Dennis, II (10) Patent No.: US 6,716,359 B1
(45) Date of Patent: Apr. 6, 2004

(54) ENHANCED TIME-BASED PROPORTIONAL CONTROL

(75) Inventor: Richard W. Dennis, II, Clifton, IL (US)

(73) Assignee: United States Filter Corporation, Palm Desert, CA (US)

( * ) Notice: Subject to any disclaimer, the term of this patent is extended or adjusted under 35 U.S.C. 154(b) by 477 days.

(21) Appl. No.: 09/650,456

(22) Filed: Aug. 29, 2000

(51) Int. Cl.$^7$ .......................... B01D 17/12; G05B 13/00
(52) U.S. Cl. ........................ 210/739; 210/143; 700/28; 700/41; 700/273
(58) Field of Search .......................... 210/96.1, 130, 210/143, 169, 198.1, 614, 662, 709, 739; 700/28, 33, 37, 41–43, 273; 706/23

(56) References Cited

U.S. PATENT DOCUMENTS

| | | |
|---|---|---|
| 2,008,684 A | 7/1935 | Craddock |
| 2,212,260 A | 8/1940 | Brothman |
| 2,249,263 A | 7/1941 | Wheelwright, Jr. |
| 2,268,461 A | 12/1941 | Nichols |
| 2,556,014 A | 6/1951 | Tolman |
| 2,651,582 A | 9/1953 | Courtney |
| 2,686,110 A | 8/1954 | Carver |
| 2,740,696 A | 4/1956 | Longwell |

(List continued on next page.)

FOREIGN PATENT DOCUMENTS

| | | |
|---|---|---|
| DE | 262 139 A3 | 11/1988 |
| DE | 4 312 417 A1 | 10/1994 |
| EP | 0 257 740 | 3/1988 |
| EP | 0 504 621 A1 | 9/1992 |
| FR | 2 672 058 A1 | 7/1992 |
| GB | 2281742 A | 3/1995 |
| JP | 11028479 | 2/1999 |
| LU | 80951 | 2/1979 |
| WO | WO 89/08728 A1 | 9/1989 |
| WO | WO 96/30307 A1 | 10/1996 |
| WO | WO 00/34760 A1 | 6/2000 |
| WO | WO 01/98558 A2 | 12/2001 |

OTHER PUBLICATIONS

Kim, Yong H., "On the Activation of Polymeric Flocculants," AIChE Annual Spring Meeting, Houston, TX, Apr. 2–6, 1989.

U.S. Filters/Stranco, "Ryznar Stability Index The 3$^{rd}$ Dimension Needed for Proper 'Water Balance,'" Aquatic Technology Newsletter, vol. 1, No. 1, pp. 1–3, undated.

U.S. Filter/Stranco, "Total Dissolved Solids, Friend or Foe?", Aquatic Technology Newsletter, vol. 1, No. 2, 1988; pp. 1–7.

U.S. Filter/Stranco, "The Relationship of ORP to PPM and Its Automated Control," Aquatic Technology Newsletter, vol. 1, No. 3, 1999, pp. 1–5.

U.S. Filter/Stranco, "The Chemistry and Control of Chloramines," Aquatic Technology Newsletter, vol. 1, No. 4, 1999, pp. 1–5.

U.S. Filter/Stranco, "Yes, Your Pool Needs Calcium Too," Aquatic Technology Newsletter, vol. 1, No. 5, pp. 1–3, Undated.

(List continued on next page.)

Primary Examiner—Joseph Drodge
(74) Attorney, Agent, or Firm—Lowrie, Lando & Anastasi, LLP (57) ABSTRACT

The instant invention is a device and method for its use which includes the addition of a deviation compensation function effective to automatically adjust the offset used in time-based proportional control. Inclusion of this improvement finds particular utility in situations like public pools where daily bather load varies depending on weather and other unpredictable factors.

14 Claims, 12 Drawing Sheets

TIME BASED PROPORTIONAL WITH INTEGRATION
CHART 7

U.S. PATENT DOCUMENTS

| | | |
|---|---|---|
| 3,252,689 A | 5/1966 | Blomgren, Sr. et al. |
| 3,319,937 A | 5/1967 | Wilson et al. |
| 3,389,970 A | 6/1968 | Scheibel |
| 3,536,646 A | 10/1970 | Hatch et al. |
| 3,559,959 A | 2/1971 | Davis et al. |
| T896,051 I4 | 3/1972 | Hamlin et al. |
| 3,702,298 A | 11/1972 | Zsoldos et al. |
| 3,742,735 A | 7/1973 | Verreyne et al. |
| 3,747,899 A | 7/1973 | Latinen et al. |
| 3,756,570 A | 9/1973 | Bühner |
| 3,794,817 A | 2/1974 | Shinskey |
| 3,852,234 A | 12/1974 | Venema |
| 3,965,027 A | 6/1976 | Boffardi et al. |
| 4,016,078 A | 4/1977 | Clark |
| 4,113,688 A | 9/1978 | Pearson |
| 4,125,574 A | 11/1978 | Kastner et al. |
| 4,146,676 A | 3/1979 | Saeman et al. |
| 4,171,166 A | 10/1979 | Trowbridge et al. |
| 4,217,145 A | 8/1980 | Gaddis |
| 4,218,147 A | 8/1980 | Rosenberger |
| 4,233,265 A | 11/1980 | Gasper |
| 4,234,440 A | 11/1980 | Hirozawa et al. |
| 4,241,016 A | 12/1980 | Hirozawa et al. |
| 4,243,636 A | 1/1981 | Shiraki et al. |
| 4,300,909 A | 11/1981 | Krumhansl |
| 4,433,701 A | 2/1984 | Cox et al. |
| 4,470,907 A | 9/1984 | Seneza |
| 4,522,502 A | 6/1985 | Brazelton |
| 4,550,011 A | 10/1985 | McCollum |
| 4,575,678 A | 3/1986 | Hladky |
| 4,581,074 A | 4/1986 | Mankina et al. |
| 4,648,043 A | 3/1987 | O'Leary |
| 4,664,528 A | 5/1987 | Rodgers et al. |
| 4,701,055 A | 10/1987 | Anderson |
| 4,719,252 A | 1/1988 | Dutton et al. |
| 4,747,978 A | 5/1988 | Loehr et al. |
| 4,752,740 A | 6/1988 | Steininger |
| 4,913,822 A | 4/1990 | Chen et al. |
| 4,965,016 A | 10/1990 | Saitoh et al. |
| 4,977,292 A | 12/1990 | Hwa et al. |
| 5,000,866 A | 3/1991 | Woyciesjes |
| 5,004,549 A | 4/1991 | Wood et al. |
| 5,018,871 A | 5/1991 | Brazelton et al. |
| 5,030,334 A | 7/1991 | Hale |
| 5,061,456 A | 10/1991 | Brazelton et al. |
| 5,112,521 A | 5/1992 | Mullins et al. |
| 5,130,033 A | 7/1992 | Thornhill |
| 5,135,968 A | 8/1992 | Brazelton et al. |
| 5,139,627 A | 8/1992 | Eden et al. |
| 5,164,429 A | 11/1992 | Brazelton et al. |
| 5,213,694 A | 5/1993 | Craig |
| 5,239,257 A | 8/1993 | Muller et al. |
| 5,256,307 A | 10/1993 | Bachhofer et al. |
| 5,262,963 A | 11/1993 | Stana Regis et al. |
| 5,306,355 A | 4/1994 | Lagana |
| 5,306,432 A | 4/1994 | Puetz |
| 5,316,031 A | 5/1994 | Brazelton et al. |
| 5,320,748 A | 6/1994 | Dupuis |
| 5,332,511 A | 7/1994 | Gay et al. |
| 5,382,367 A | 1/1995 | Zinkan et al. |
| 5,422,014 A | 6/1995 | Allen et al. |
| 5,424,032 A | 6/1995 | Christensen et al. |
| 5,489,344 A | 2/1996 | Martin et al. |
| 5,494,588 A | 2/1996 | LaZonby et al. |
| 5,575,920 A | 11/1996 | Freese et al. |
| 5,658,467 A | 8/1997 | LaZonby et al. |
| 5,683,654 A | 11/1997 | Dallmier et al. |
| 5,736,097 A | 4/1998 | Ono |
| 5,770,039 A | 6/1998 | Rigney et al. |
| 5,783,092 A | 7/1998 | Lines et al. |
| 5,785,867 A | 7/1998 | LaZonby et al. |
| 5,800,732 A | 9/1998 | Coughlin et al. |
| 5,814,233 A | 9/1998 | Starkey et al. |
| 5,814,247 A | 9/1998 | Derule et al. |
| 5,820,256 A | 10/1998 | Morrison |
| 5,849,985 A | 12/1998 | Tieckelmann et al. |
| 5,855,791 A | 1/1999 | Hays et al. |
| 5,858,246 A | 1/1999 | Rafter et al. |
| 5,858,249 A | 1/1999 | Higby |
| 5,866,013 A | 2/1999 | Kessler et al. |
| 5,882,526 A | 3/1999 | Brown et al. |
| 5,888,374 A | 3/1999 | Pope et al. |
| 5,895,565 A | 4/1999 | Steininger et al. |
| 5,902,751 A | 5/1999 | Godec et al. |
| 5,947,596 A | 9/1999 | Dowd |
| 5,972,196 A | 10/1999 | Murphy et al. |
| 5,980,758 A | 11/1999 | LaZonby et al. |
| 5,985,155 A | 11/1999 | Maitland |
| 6,015,484 A | 1/2000 | Martinchek et al. |
| 6,030,842 A | 2/2000 | Peachy-Stoner |
| 6,045,706 A | 4/2000 | Morrison et al. |
| 6,068,012 A | 5/2000 | Beardwood et al. |
| 6,106,770 A | 8/2000 | Ohki et al. |
| 6,120,619 A | 9/2000 | Goudiakas et al. |
| 6,120,698 A | 9/2000 | Rounds et al. |
| 6,132,593 A | 10/2000 | Tan |
| 6,143,184 A | 11/2000 | Martin et al. |
| 6,146,538 A | 11/2000 | Martin |
| 6,149,819 A | 11/2000 | Martin et al. |
| 6,159,552 A | 12/2000 | Riman et al. |
| 6,238,555 B1 | 5/2001 | Silveri et al. |
| 6,284,144 B1 | 9/2001 | Itzhak |
| 6,315,950 B1 | 11/2001 | Harp et al. |
| 6,409,926 B1 | 6/2002 | Martin |
| 6,419,817 B1 | 7/2002 | Martin |
| 6,423,234 B1 | 7/2002 | Martin |
| 6,535,795 B1 * | 3/2003 | Schroeder et al. ......... 210/96.1 |
| 2002/0043650 A1 | 4/2002 | Martin |

OTHER PUBLICATIONS

U.S. Filter/Stranco, "Why Do I Have Algae In My Pool?" Aquatic Technology Newsletter, vol. 1, No. 6, 1999, pp. 1–2.

Carpenter, Colleen et al., "Chlorine Disinfection of Recreational Water for *Cryptosporidium parvum*," *Emerging Infectious Diseases*, vol. 5, No. 4, Jul.–Aug. 1999, pp. 579–584.

U.S. Filter/Stranco, "ECS–Pool (w/CHF–150) Engineering Packet," Apr. 22, 1999.

Kowalsky, L., "Pool–Spa Operators Handbook," National Swimming Pool Foundation, 1983–1990.

Lynntech, Inc., "Electrochemical Ozone Generator," Model 124 Product Literature (date unknown).

U.S. Filter/Stranco, "Strantrol Automated Water Chemistry Control for Commercial Pools," 1998.

U.S. Filter/Stranco, "Strantrol System 3 Pool & Spa Chemistry Controller," 2000.

U.S. Filter/Stranco, "Strantrol System 4 Pool & Spa Chemistry Controller," 2000.

U.S. Filter/Stranco, "Strantrol System5F Pool & Spa Chemistry Controller," 2000.

U.S. Filter/Stranco, "Strantrol System6 Pool Chemistry & Filter Backwash Controller," 2000.

U.S. Filter/Stranco, "Strantrol System7 Mechanical Room Controller for Aquatic Facilities," 2000.

Kloberdanz, B., "The Air in There: Enhancing in Indoor Pool Environment," Recreation Management, 2000.

Selvick, E., "Take Control of 'Yo–Yo' Treatment Cycles," International Aquatics, National Trade Publications, Inc., Jul./Aug. 1997.

Frazier, B., "Automation to the Rescue," Aquatics International, May/Jun. 1998.

Batt, T. et al., "The Water Down Under," Parks & Recreation, Nov. 1999.

Krone, D., "Automated Water Chemistry Control at University of Virginia Pools," Facilities Manager, vol. 13, No. 6, Nov./Dec. 1997.

U.S. Filter/Stranco, "Remote Monitoring for Unstaffed Pools," Parks & Recreation, Nov. 1997.

Minton, E., "On the Waterpark," Swimming Pool/Spa Age (date unknown).

U.S. Filter/Stranco, "Environmental Control at Indoor Pool: New ECS System Eliminates Chronic Air Quality Woes For New York School Distric Pool," Stranco Products Capsule Case History #806, Jul. 1998.

U.S. Filter/Stranco, "Environmental Control at Indoor Pool Complex: New ECS System Optimizes Air & Water Quality at Colorado Recreation Center," Stranco Products Capsule Case History #807, Nov. 1998.

U.S. Filter/Stranco, "Environmental Control at Indoor Pool: Parks District Uses New ECS System to Eliminate Chronic Air Quality Problems at High School Pool," Stranco Products Capsule Case History #808, May 1999.

U.S. Filter/Stranco, "Environment Control at Indoor Pool: ECS System Optimizes Air & Water Quality at Texas School District Swim Center," Stranco Products Capsule Case History #811, Nov. 1999.

U.S. Filter/Stranco, "Environmental Control at Special Indoor Pool: New ECS System Eliminates Chronic Air Quality Woes in School District Pool & Spa Serving Special Needs Children," Stranco Products Capsule Case History #812, Oct. 1999.

U.S. Filter/Stranco, "Environmental Control at Indoor Pool: ECS System Eliminates Chronic Air Quality Problems at High School and Parks District Indoor Pool Facility," Stranco Products Capsule Case History #813, Jul. 2000.

U.S. Filter/Stranco, "Environmental Control at Indoor Pool: ECS System Optimizes Air & Water Quality at Iowa Recreation Center," Stranco Products Capsule Case History #814, May 2000.

U.S. Filter/Stranco, "Air & Water Quality Control for Indoor Aquatic Facilities," U.S. Filter Corporation, 1998.

U.S. Filter/Stranco, "Strantrol ECS—Environmental Control System (For Pool)," 2000.

U.S. Filter/Stranco, "Abstracts of Strancol ECS Case Histories." (date unknown).

Williams, K., "Aquatic Facility Operator Manual," National Recreation and Park Association, Second Edition, 1995.

Normenausschusse, Wasserwesen, "Treatment and disinfection of water used in bathing facilities," DIN 19643–4, Feb. 1999.

Normenausschusse Wasserwesen, "Treatment and disinfection of water used in bathing facilities," DIN 19643–3, Apr. 1997.

Normenauschusse Wasserwesen, "Treatment and disinfection of water used in bathing facilities," DIN 19643–2, Apr. 1997.

Normenausschusse Wasserwesen, "Treatment and disinfection of water used in bathing facilities," DIN 19643–1, Apr. 1997.

Stranco, "The Best of Poolfax," The Poolfax Newsletter, 1981–1984.

Victorin et al., "Redox potential measurements for determining the disinfecting power of chlorinated water," J. Hyg. Camb., 70, 1972, pp. 313–323.

U.S. Filter/Stranco, "Environmental Control System Training Meeting, Mar. 15, 2000".

Kim, Yong H., "Evaluation of Redox Potential and Chlorine Residual as a Measure of Water Disinfection," presented at the 54th International Water Conference, Pittsburgh, PA, Oct. 11–19, 1993.

Scully et al., Disinfection Interference in Wastewaters by Natural Organic Nitrogen Compounds Environ. Sci. Techn., vol. 30, No. 5, 1996, pp. 1465–1471.

White, Geor. Clifford, Handbook of Chlorination and Alternative Disinfectants, Third Edition, (date unknown), pp. 801, 803–809, 922–924.

Carlson, S., "Fundamentals of water disinfection," J. Water SRT—Aqua, vol. 40, No. 6, (1991), pp. 346–356.

Lund, E., "Oxidative Inactivation of Poliovirus," from the Virological Laboratory of the Department of Bacteriology, University of Gothenburg, and the Virological Department of the Municipal Laboratories, Gothenburg, Sweden, Springer–Verlag, (1963), pp. 1–49.

Lund et al., "The Effect of Oxidation and Reduction on the Infectivity of Poliomyelitis Virus," from the Virological Laboratory of the Department of Bacteriology, University of Gothenburg, and the Virological Department of the Municipal Laboratories, Gothenburg, Sweden, Springer–Verlag, (1961), pp. 100–110.

Lund, E., "Inactivation of Poliomyelitis Virus by Chlorination at Different Oxidation Potentials." from the Virological Laboratory of the Department of Bacteriology, University of Gothenburg, and the Virological Department of the Municipal Laboratories, Gothenburg, Sweden, Springer–Verlag, (1961), pp. 330–342.

Lund, E., "The Significance of Oxidation in Chemical Incativation of Poliovirus," from the Virological Laboratory of the Department of Bacteriology, University of Gothenburg, and the Virological Department of the Municipal Laboratories, Gothenburg, Sweden, Springer–Verlag, (1963), pp. 1–13.

Lund, E., "The Rate of Oxidative Inactivation of Poliovirus and its Dependence on the Concentration of the Reactants," from the Virological Laboratory of the Department of Bacteriology, University of Gothenburg, and the Virological Department of the Municipal Laboratories, Gothenburg, Sweden, Springer–Verlag, (1963), pp. 1–18.

Stranco, "Solutions: Effluent Dechlorination", Stranco Product Literature (date unknown).

Hensley, R. et al., "Disinfection Metamorphosis: From Chemicals to Control," Operations Forum, vol. 12, No. 4, Apr. 1995.

Hetzler, J.T. et al., "ORP: A Key to Nutrient Removal," Operations Forum, vol. 12, No. 2, Feb. 1995.

Bossard, G. et al., "Optimizing Chlorination/Dechlorination at a Wastewater Treatment Plant," reprinted from Public Works, Jan. 1995.

Eddington, Gordon, "Successfully Managing Wastewater Chlorination," Stranco Product Literature (date unknown).

Ryan, D. et al., "Waste Not, Want Not: Avoiding Chemical Excesses," reprinted from Operations Forum, vol. 11, No. 4, Apr. 1994.

D'Adam, D. et al., "A Case Study of Wastewater Plant Disinfection," reprinted from *Public Works Magazine*, Nov., 1994.

"Louisiana Plant Uses New Technology for Dechlorination," reprinted from *American City & County*, Feb. 1994.

Kiser, P. et al., "ORP or Residual: Which Measures Oxidation?" Sep. 10, 1992, pp. 1–7.

"Aquasol Controllers: Chemical Automation for Pools and Spas," Product Literature (date unknown).

"Pool and Spa Controller: Acu–200 Pool Management Software," Product Literature (date unknown).

"Acu–Trol Programmable Controllers," Product Literature from www.acu–trol.com. printed Nov. 19, 1999.

Santa Barbara Control Systems, "Chemtrol™ PC Programmable Controllers: Integrated Water Treatment with Remote Control," Product Literature, (date unknown).

"Chemtrol Automtic Pool Controllers," Product Literature from www.sbcontrol.com, printed Nov. 19, 1999.

"Chemtrol—PC6000 Controller," Product Literature from www.sbcontrol.com, printed Nov. 19, 1999.

"Chemtrol—PC3000 Controller," Product Literature from www.sbcontrol.com, printed Nov. 19, 1999.

"AK 100 Swimming Pool Control Systems," Product Literature from www.acu–trol.com, printed Nov. 19, 1999.

ACU–TROL, "AK100 Series" Product Literature (date unknown).

ACU–TROL, "Acu–Trol Programmable Controllers: AK 100 Series and AK200," Product Literature (date unknown).

Aquasol Controllers, Inc., "Aquasol WTC," Product Literature, (date unknown).

Aquasol Controllers, Inc., "What is a Controller?" Product Literature from www.aquasol.com, printed Nov. 19, 1999.

Aquasol Controllers, Inc., "Aquasol WTC Specifications," Product Literature from www.aquasol.com, printed Nov. 19, 1999.

Aquasol Controllers, Inc., "Aquasol SPC Specifications," Product Literature from www.aquasol.com, printed Nov. 19, 1999.

ACU–TROL, "AK 100 Summary," Product Literature from www.acu–trol.com, printed Nov. 19, 1999.

CAT Controllers, "CAT 2000+ Programmable Water Chemistry Controller," Product Literature (date unknown).

Rola–Chem Corporation, "The New Wave in Water Management: Take Control with Rola–Chem," Product Catalog, Apr. 1999.

Strand, R. et al., "ORP As A Measure of Evaluating and Controlling Disinfection in Potable Water," (Source and date unknown).

Mansfeld et al.. "Electrochemical Noise Analysis of Iron Exposed to NaCl Solutions of Different Corrosivity," *J. Electrochem. Soc.*, vol. 141, No. 5, May 1994, pp. 1402–1404.

Brusamarello et al., "Analysis of Different Methods to Calculate Electrochemical Noise Resistance Using a Three–Electrode Cell," *Corrosion*, vol. 56, No. 3, Mar., 2000, pp. 273–282.

Mansfeld et al., "Electrochemical Noise Analysis of Iron Exposed to NaCl Solutions of Different Corrosivity," *J. Electrochem. Soc.*, vol. 140, No. 8, Aug. 1993, pp. 2205–2209.

Dexter et al., "Use and Limitations of Electrochemical Techniques for Investigating Microbiological Corrosion", Corrosion, 1991, vol. 47, No. 4, pp. 308–318.

Gusmano et al., "Electrochemical Noise Resistance as a Tool for Corrosion Rate Prediction", Corrosion, 1997, vol. 53, No. 11, pp. 860–868.

* cited by examiner

CHART 5 SHOWS THE IDEAL RESPONSE OF A TIME BASED PROPORTIONAL CONTROL SYSTEM.

TIME BASED PROPORTIONAL WITH INTEGRATION
CHART 7

FIG. 8

EXPECTED TIME BASED PROPORTIONAL WITH INTEGRAL RESPONSE (UNDER LOAD)
CHART 8

ENHANCED TIME-BASED PROPORTIONAL CONTROL

FIELD OF THE INVENTION

This invention relates to time-based proportional control useful for chemical dosage control of water purification systems, such as the addition of chlorine to municipal swimming pools. The invention particularly relates to improvements in a time-based proportional control system for automating dosage control.

BACKGROUND OF THE INVENTION

Virtually all chemical dosage controllers marketed by U.S. Filter/Stranco within the last 10–12 years for use in the aquatic and industrial/municipal markets include a form of proportional chemical dosage control commonly referred to as Time-Based Proportional Control. Time-based proportional control has demonstrated usefulness for applications in cooling towers and other recirculated or batch systems that may experience dramatic loading swings.

Time-Based Proportional control was originally developed for use in spa applications where the chlorine demand will vary considerably due to small water volumes and the ratio of bodies/gallons of water in a spa. Standard on/off control for this application was inadequate, as the only adjustment was the chlorine feed rate. On/off only control suffers from overshooting in either low loading situations, or inability to reach setpoint in high loading situations. A common method of addressing said overshooting is to manually adjust feed rates upwardly during the day and downwardly at night.

Time-Based Proportional control is basically a variation of on/off control which utilizes a relay output. Time-based proportional control utilizes a type of pulse width modulation effective to vary the duty cycle of the output relay on-time with respect to the deviation from setpoint. The duty cycle period is typically 30 seconds to one minute. As the sensor moves farther away from setpoint, the percentage of on-time per minute will increase. Conversely, the closer the sensor moves towards setpoint, the less the feeder operates per minute. Whenever the sensor of the controller exceeds setpoint, the feeder is always off. Recent improvements to this control have been the addition of an offset to keep the feeder from completely stopping until the setpoint is exceeded by some value and the ability to change the duty cycle period.

A deficiency of the time-based proportional control function is that it fails to operate efficiently because it never reaches setpoint on high loading days—when it is needed the most.

Thus, what is lacking in the art is an ability to incorporate a form of deviation compensation which could be described as time-based proportional control with automatic offset, to thus include a functionality, having a relatively small number of resets per minute and a low sensitivity which, when incorporated therein, would eliminate the systems failure to achieve setpoint on high loadings days.

SUMMARY OF THE INVENTION

The instant invention is a device and method for its use which includes the addition of a type of deviation compensation function which, in effect, provides an automatic offset ability which is effective for automatically adjusting the offset used in time-based proportional control. In practice actual offset adjustment is not always necessary. An equivalent result is achievable by including a mathematical incrementation of the duty cycle ratio. Inclusion of this improvement finds particular utility in situations like public pools where daily bather load varies depending on weather and other unpredictable factors.

Accordingly, it is an objective of the instant invention to teach a method and device to enhance time-based proportional dosing of chemical additives by inclusion of a form of deviation compensation effective to approximate an ideal proportional control response.

It is a further objective of the invention to provide an ideal proportional control response by providing time based proportional control with automatic offset.

It is yet another objective of the instant invention to provide an ideal proportional control response by mathematically incrementing the duty cycle ratio.

It is a still further objective of the instant invention to provide ideal proportional control response by including integration of a measured signal.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE INVENTION

Time-Based Proportional control devices, for example devices available from USFilter/Stranco under the name STRANTROL are an improvement of the On/Off control method. On/Off is commonly used for simple automatic process control.

To explain the improvement Time Based Proportional control provides, it is best to first explain the On/Off control method and its limitations.

Note that in FIGS. 1–8 the X-axis represents time and the Y-axis represents the stated value but is not unit dependent, e.g. for proportional band width (PB), the graphical analysis is independent of whether the setpoint units are in mV, pH, microsiemens, or the like.

Figure 1:
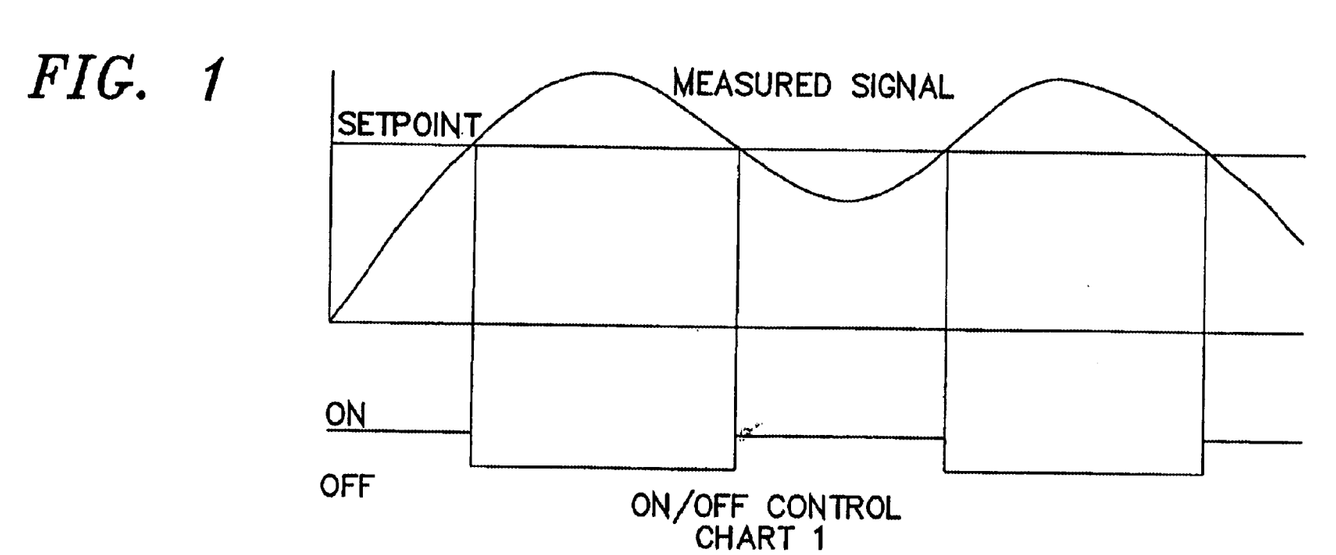
FIG. 1 is a graphical representation of prior art on/off control.

Now referring to FIGS. 1, On/Off control, as the name implies, has only two control states, ON and OFF. A disinfection control system feeding a chemical like Sodium Hypochlorite can be used as a good example. When the measured signal (HRR) is below the desired value (setpoint), the controller output is ON and stays on continuously until the measured signal meets or exceeds the setpoint. When the measured signal equals or exceeds the setpoint, the controller output changes to the OFF condition and the chemical feeder stops adding more chemical to the system.

With respect to specific chemical feeders, the controlling limitation is the ability of the feed system to tolerate a power on duty cycle of fractions of a minute. High current rotational motor driven pumps can be damaged by short duty cycles such as 30 seconds on, 30 seconds off. Motor-operated ball valves also cannot tolerate short duty power applications. US Filter/Stranco utilizes Time-Based Proportional (TBP) control to regulate their patented CHF-150 Calcium Hypochlorite feeder, along with a variety of brands of solenoid-motor diaphragm metering pumps. It is likewise within the purview of the instant invention to utilize time based proportional control to regulate peristaltic pumps from various manufacturers, solenoid valves that control water flow to venturi-type ejectors used to feed gaseous and liquid chemicals into water such as Chlorine, Sulfur Dioxide, Carbon Dioxide, and the like. Additionally, the use of TBP to control special duty solenoid valves that operate under pressure or vacuum to control chemicals (liquid and gaseous) fed, for example, to US Filter/Stranco's patented WATER CHAMP gas induction feeders, $CO_2$ feeders and the like are also contemplated.

Figure 2:
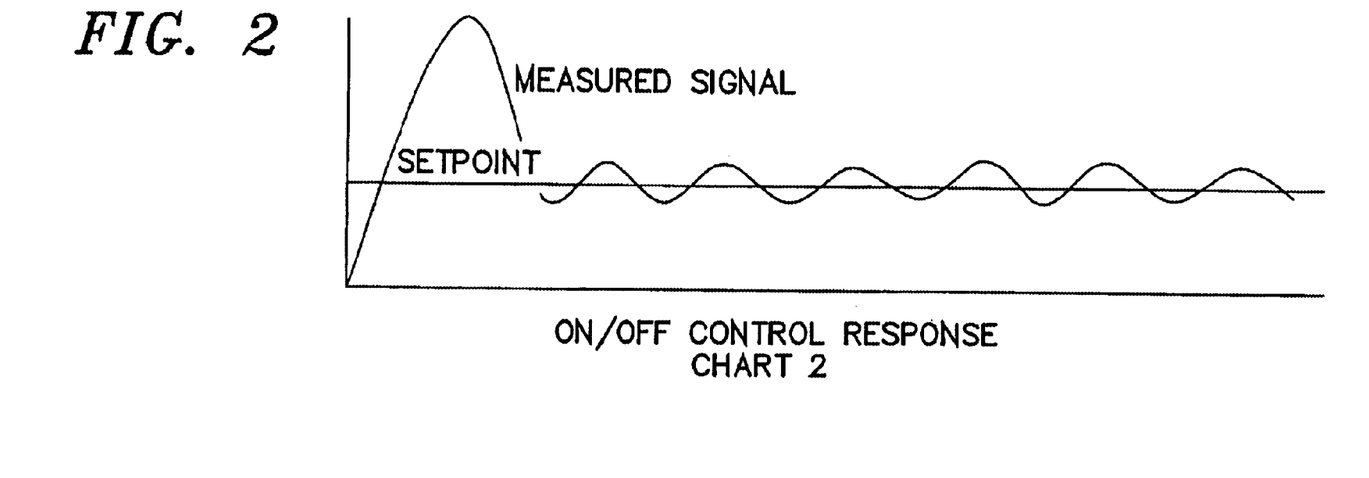
FIG. 2 illustrates a typical on/off response curve.

As further illustrated in FIG. 2, a typical on/off response curve is exemplified. The limitations of this control method are the system lag time and loading. In most industrial applications, ON/OFF control always overshoots the setpoint both on the increase and decrease of the measured signal. In the disinfection control example, when the HRR exceeds the setpoint, the chemical fed to the system stops, but the mixing and distribution of the chemical fed during the lag time continues to increase the system's HRR. This sinusoidal response is very typical for this control method. Restricting the flow rate of chemical to the system can minimize the sine wave amplitude, however during high load events the chemical feed will be unable to meet the demand. The result is that some overshoot is accepted as the limitation of an inexpensive (and simple) control method.

Figure 3:
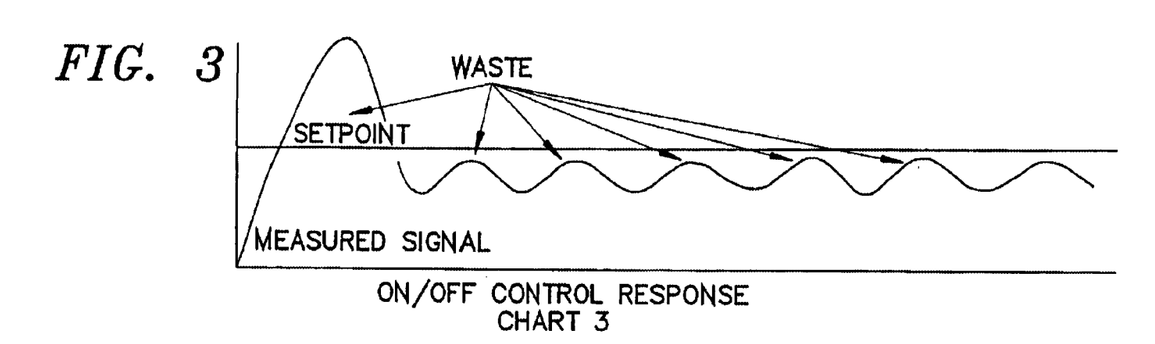
FIG. 3 graphically illustrates chemical wastage.

As particularly illustrated in FIG. 3, the height of the first peak will vary based upon the response time of the system, and the initial deviation from setpoint. The areas under the curve (above the setpoint) also represent wasted chemical.

Figure 4:
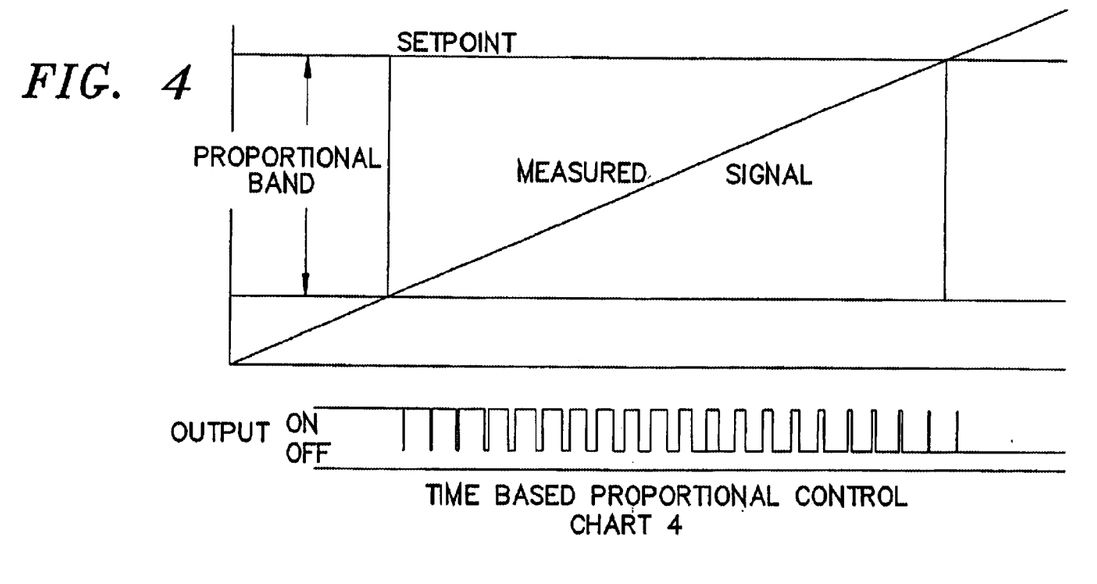
FIG. 4 illustrates typical time-based proportional control.

Now referring to FIG. 4, typically Time Based Proportional response improves upon the simple control method by adjusting the feed rate of chemical based upon the measured signal's deviation from setpoint. In Time Based Proportional control, the ON time per minute of the output relay is varied based upon the measured signal's distance from setpoint. This is very similar to the P of P. I. D. control, except the output is not continuous. The advantage can be seen using the same disinfection example. If one turns the Sodium Hypochlorite pump on for 10 seconds and off for 50 seconds when you are only 1 mV below the desired HRR, the rate of HRR rise will be far less per minute and the overshoot will be minimal. FIG. 4 illustrates the output feed ratio of time based proportional control throughout the proportional band. The benefit of time based proportional control is a more consistent disinfection rate (less corrosion and fouling), and chemical is conserved because chemical is not being fed to exceed the desired disinfection rate.

Figure 5:
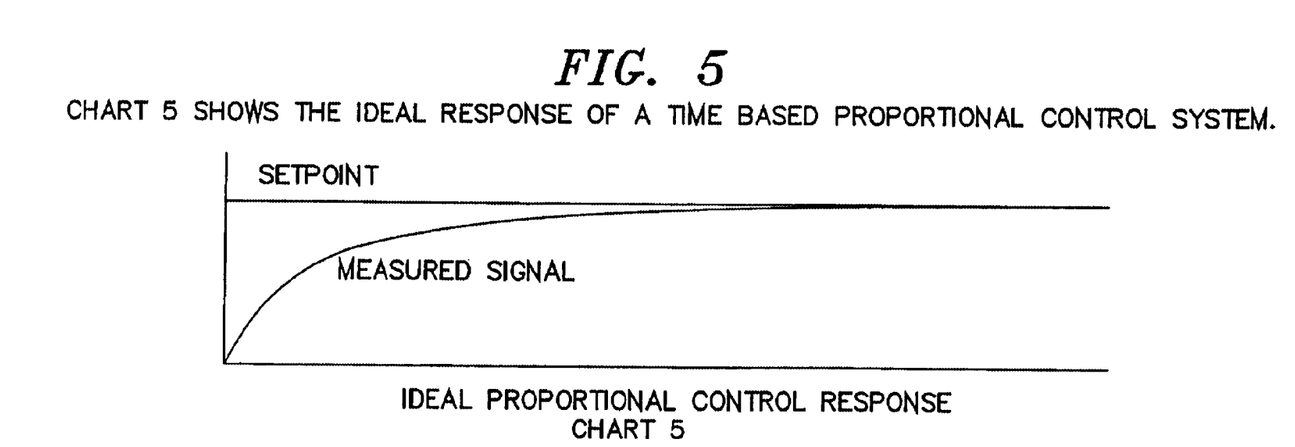
FIG. 5, illustrates the ideal response of a Time Based Proportional control system.

With reference to FIG. 5, the ideal response of a Time Based Proportional control system is illustrated.

Figure 6:
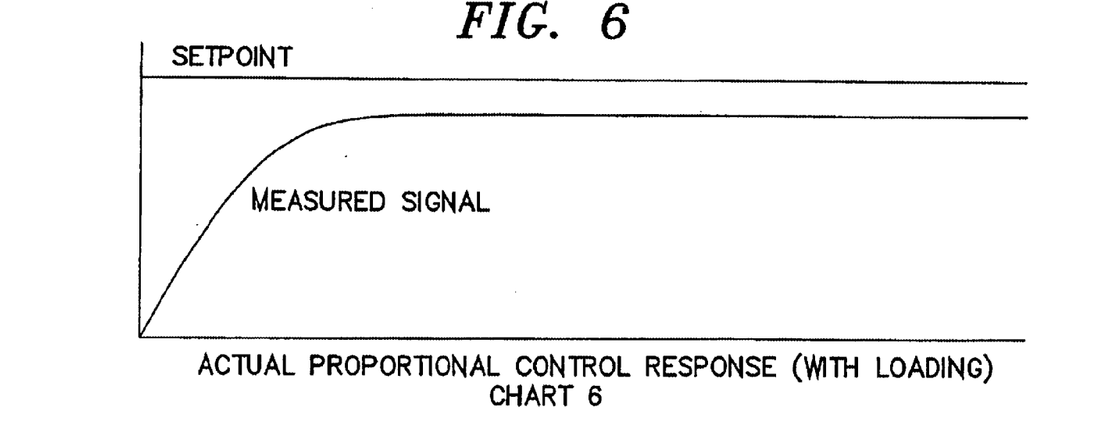
FIG. 6 illustrates actual proportional control response with loading.

Proceeding to FIG. 6, while Time Base Proportional control is an improvement over ON/OFF control, it still has certain limitations. With large fluctuations of loading, Time-based proportional control may not increase the output enough to compensate. Using the disinfection example again, when an increased loading condition occurs, the controller using Time Based Proportional control will proportion the output to increase the Sodium Hypochlorite feed rate to the system. But as the HRR starts to rise, the controller will reduce the output at the same ratio as the previous loading. The result is a setpoint that may never be achieved, because it now takes more Sodium Hypochlorite to maintain the same HRR (due to loading).

In order to address the inability of a time based proportional control system to achieve setpoint during a loaded condition, the instant invention incorporates an additional response into Time-based proportional control that will compare the measured signal to the setpoint with respect to time, and increase or decrease the output time ratio (duty cycle) to compensate for loading as needed. This is accomplished by increasing or decreasing an offset value applied to the control setpoint.

Figure 7:
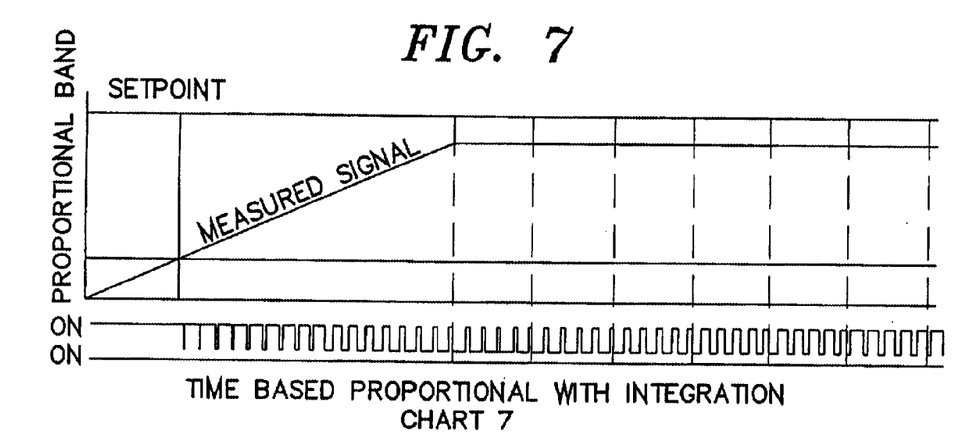
FIG. 7 shows the programmed response of the Time Based Proportional control with the addition of Integral response.

FIG. 7 depicts the programmed response of the Time Based Proportional control with the addition of selected time duration response. The rate of change would be tied proportionally to the deviation from setpoint and may be adjustable with software. The time base used for the selected time duration response would be different (usually longer) than the proportional time base, is generally set forth as a multiple thereof, and can also be adjustable. Typically, in the recirculated systems currently controlled by time based proportional control, the selected time duration response time base would about 5 minutes.

Figure 8:
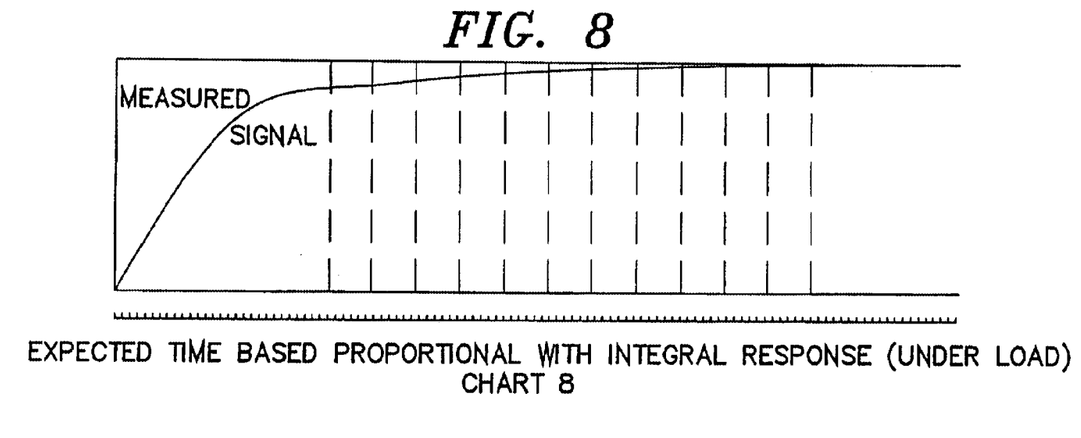
FIG. 8 is illustrative of the expected time-based proportional control with integral response in a typical HRR (High Resolution Redox) loading situation.

Referring to FIG. 8, the figure is illustrative of the expected time-based proportional control with selected time duration response in a typical HRR loading situation as described in the text above. As is readily appreciated, this curve closely mirrors the ideal proportional control response as set forth in FIG. 5.

Figure 9A:
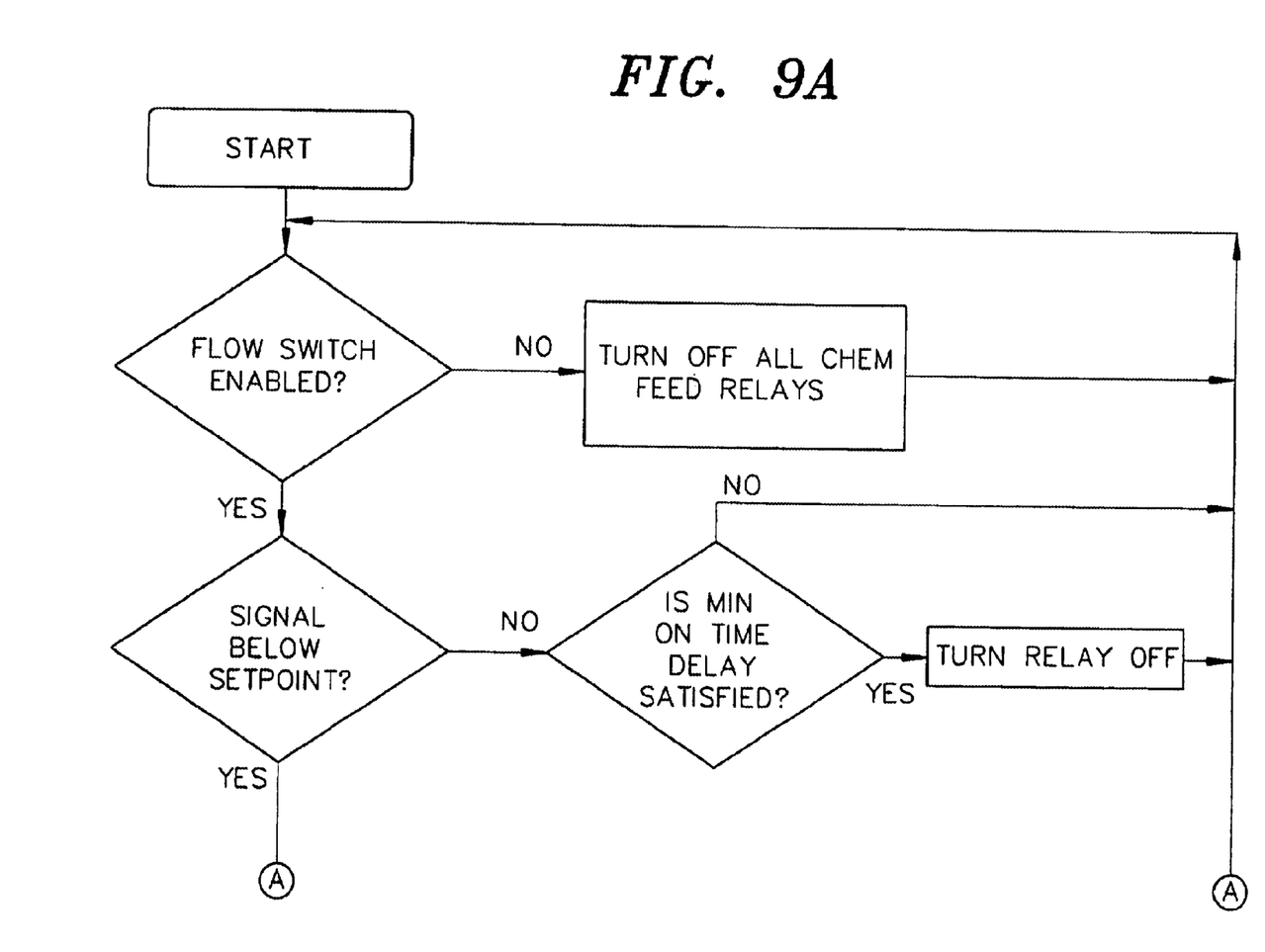
FIG. 9 is illustrative of a feed up example utilizing timed base proportional logic.
Figure 9B:
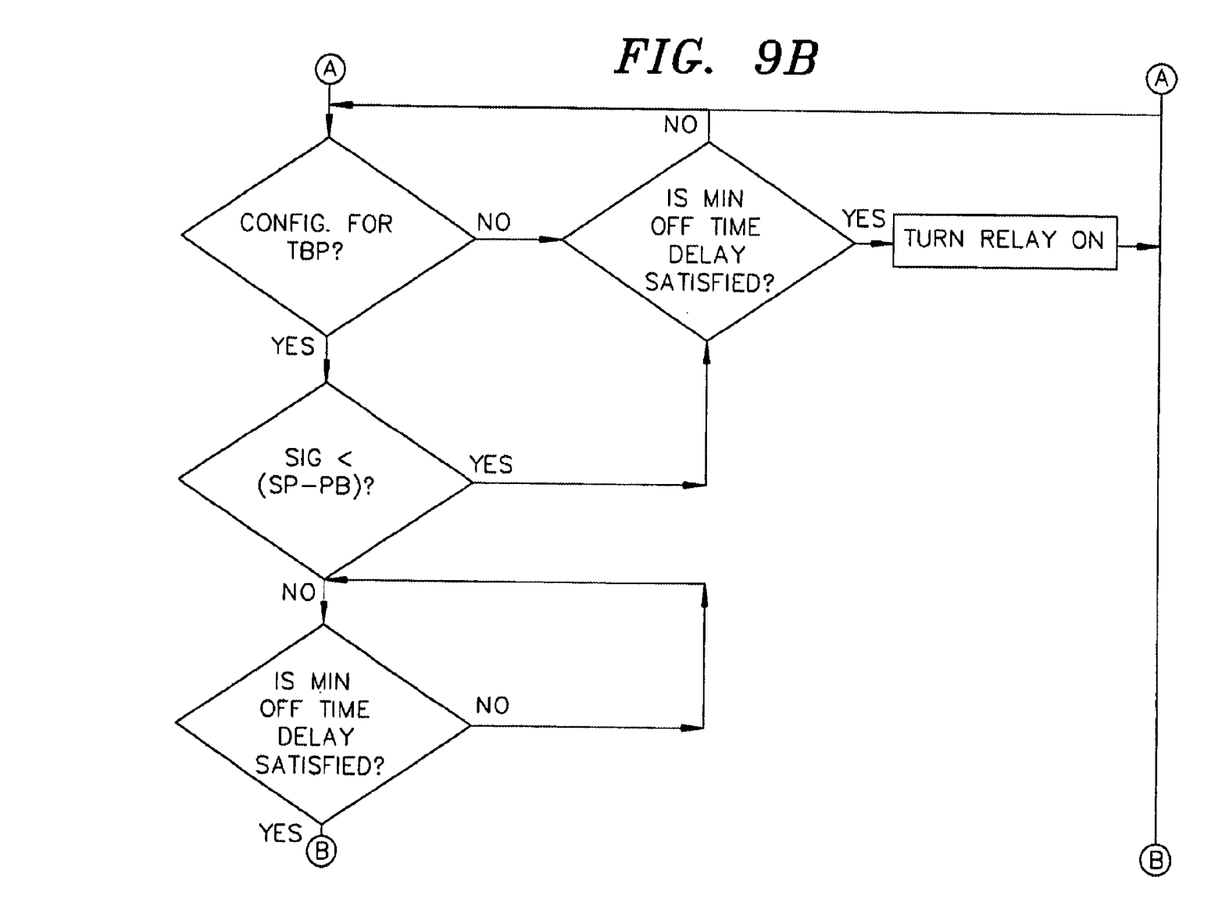
Figure 9C:
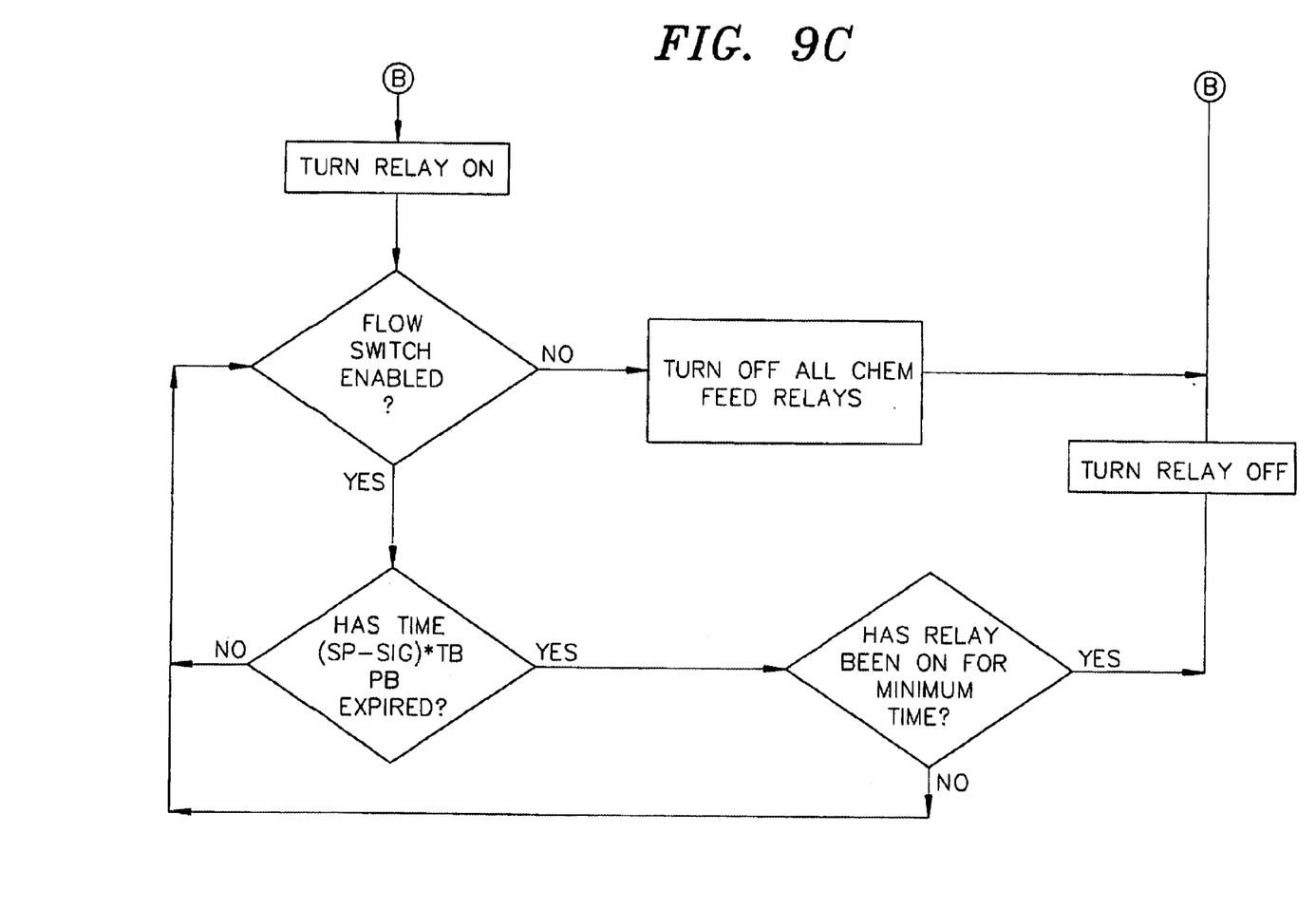
Figure 10A:
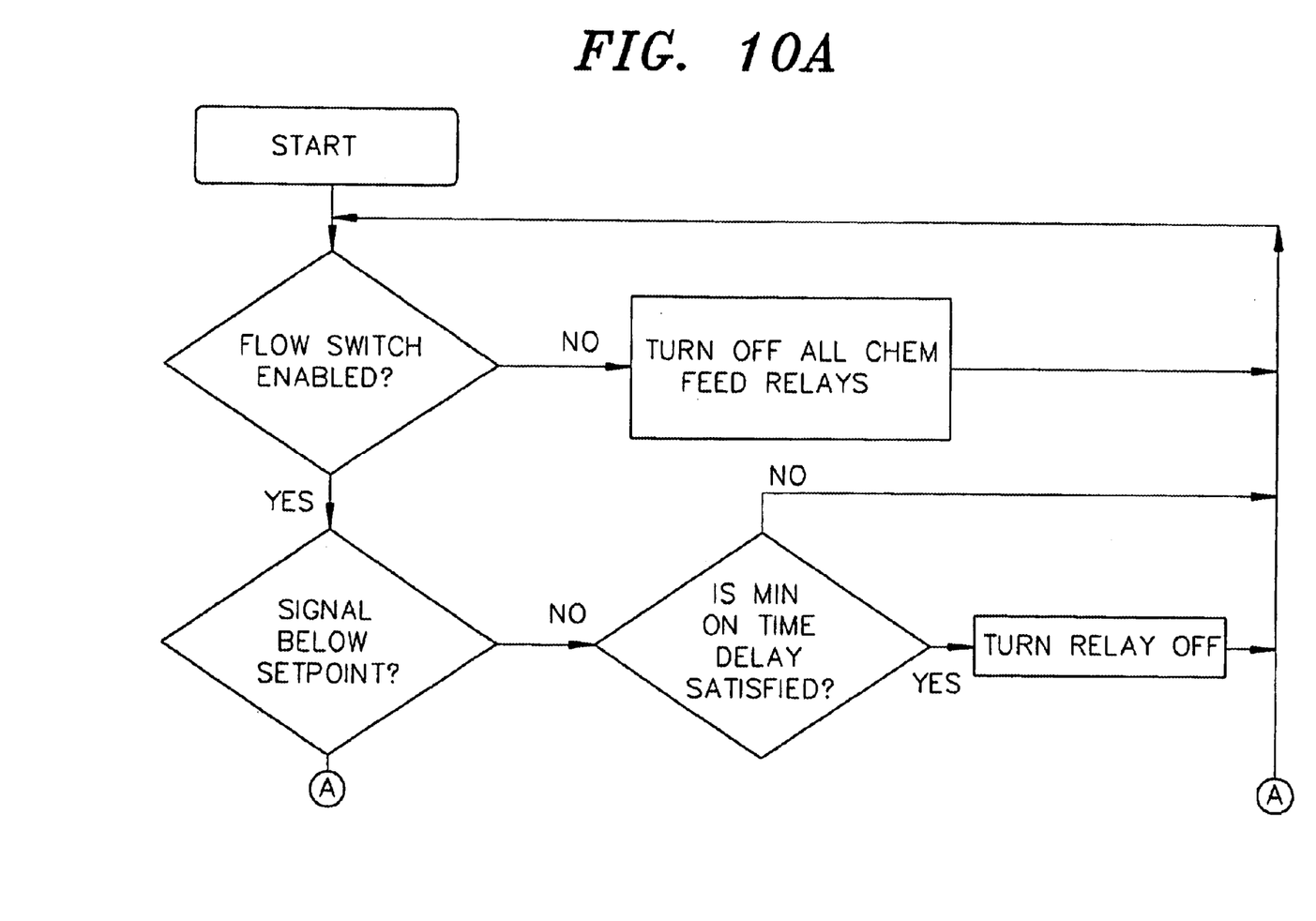
FIG. 10 modifies the prior art proportional logic mode of operation by including integration of a measured signal.
Figure 10B:
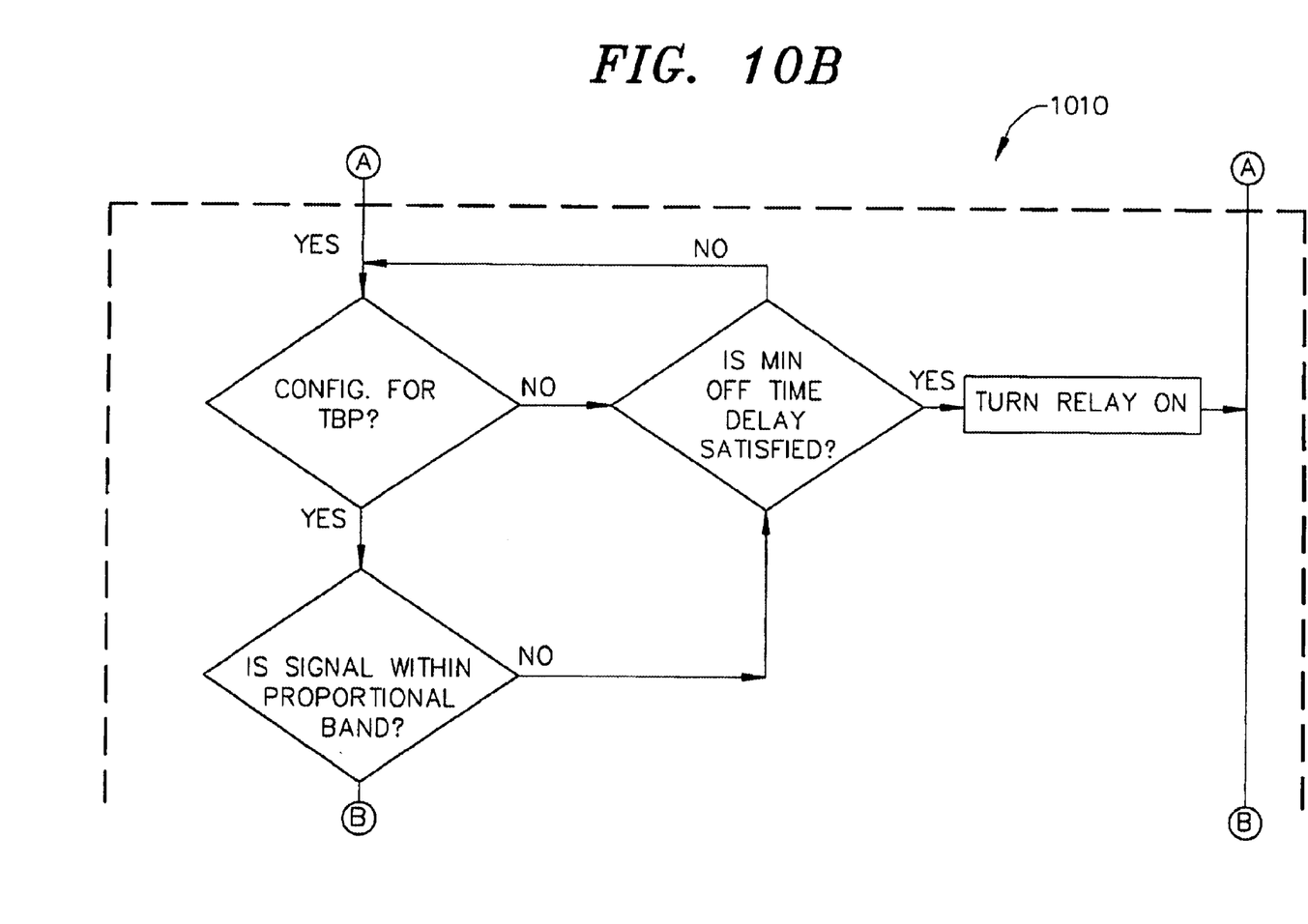
Figure 10C:
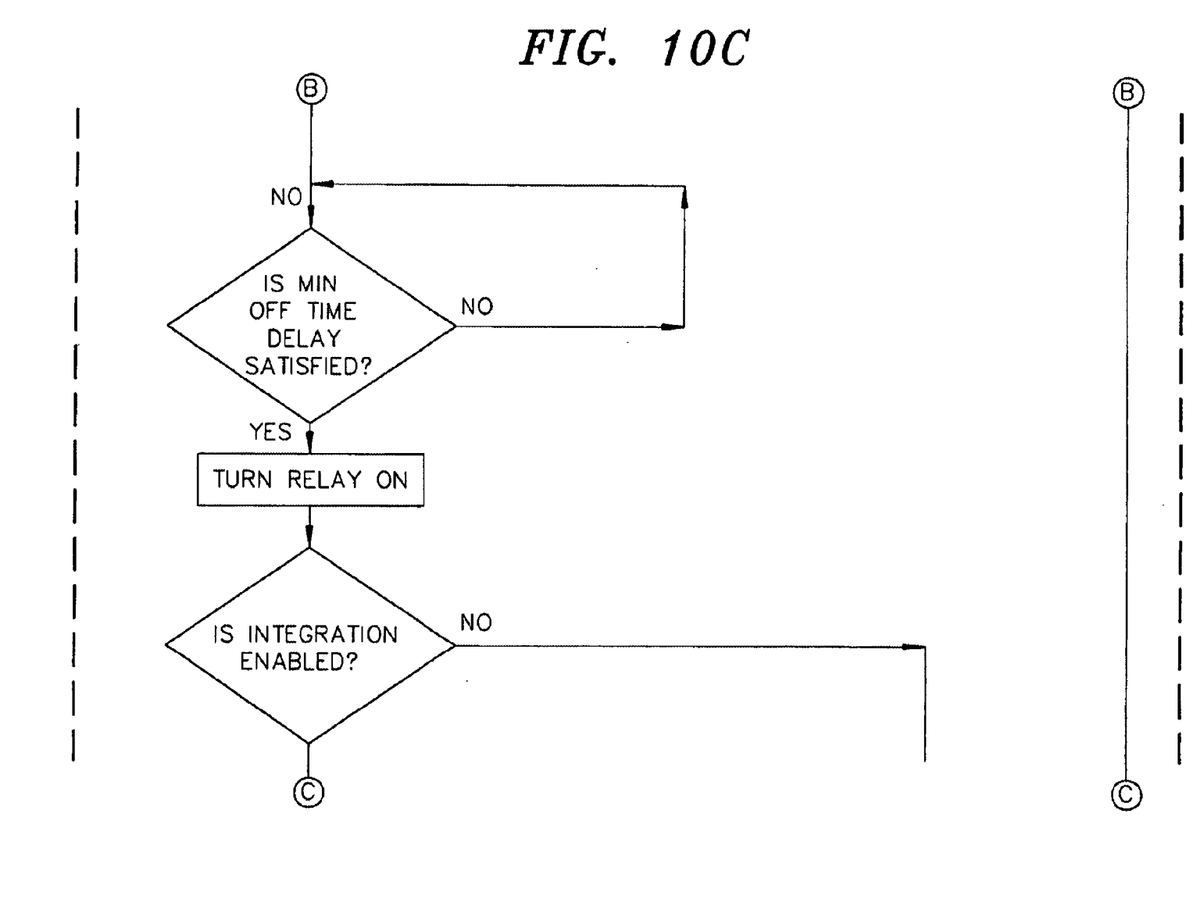
Figure 10D:
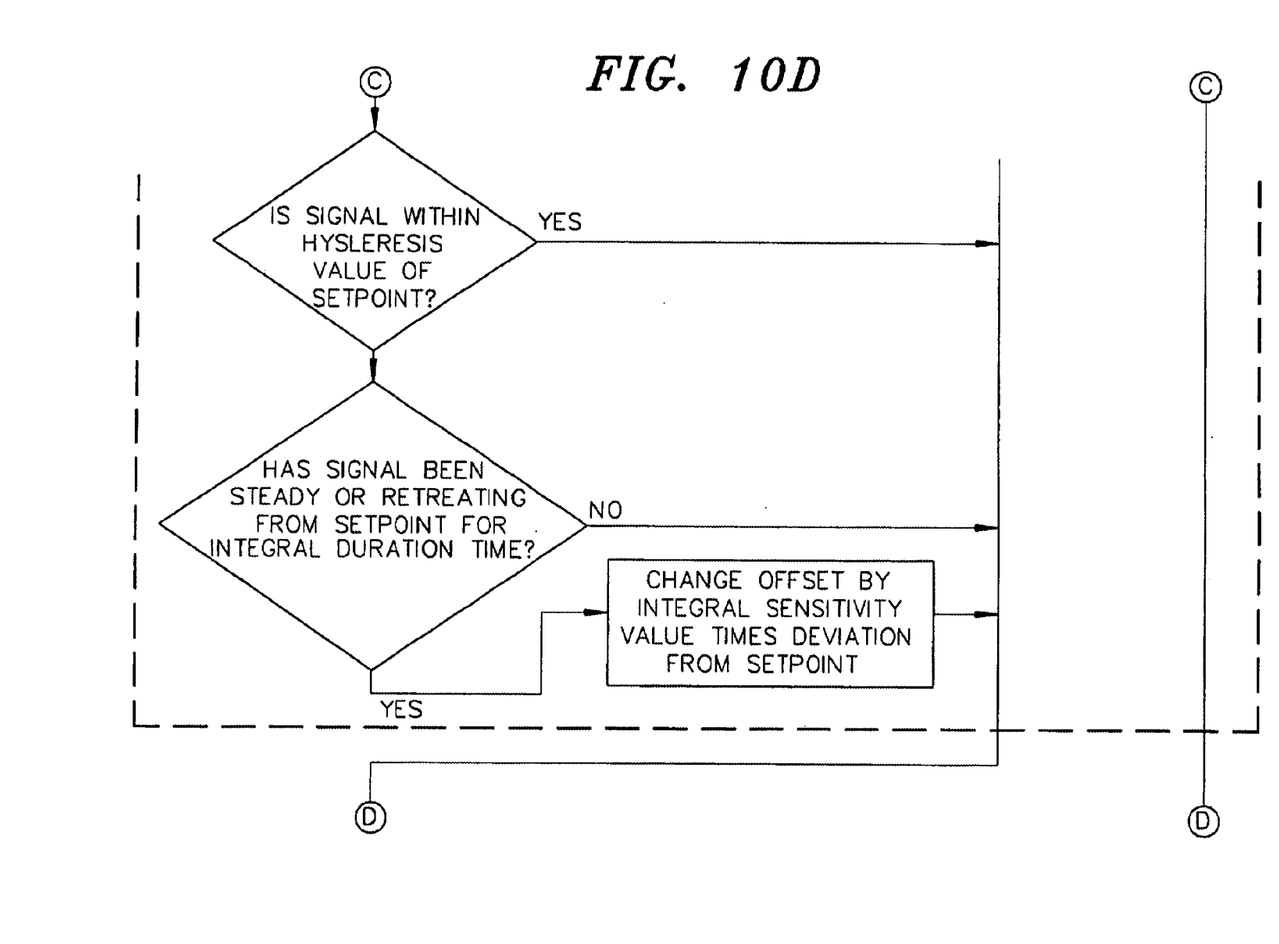
Figure 10E:
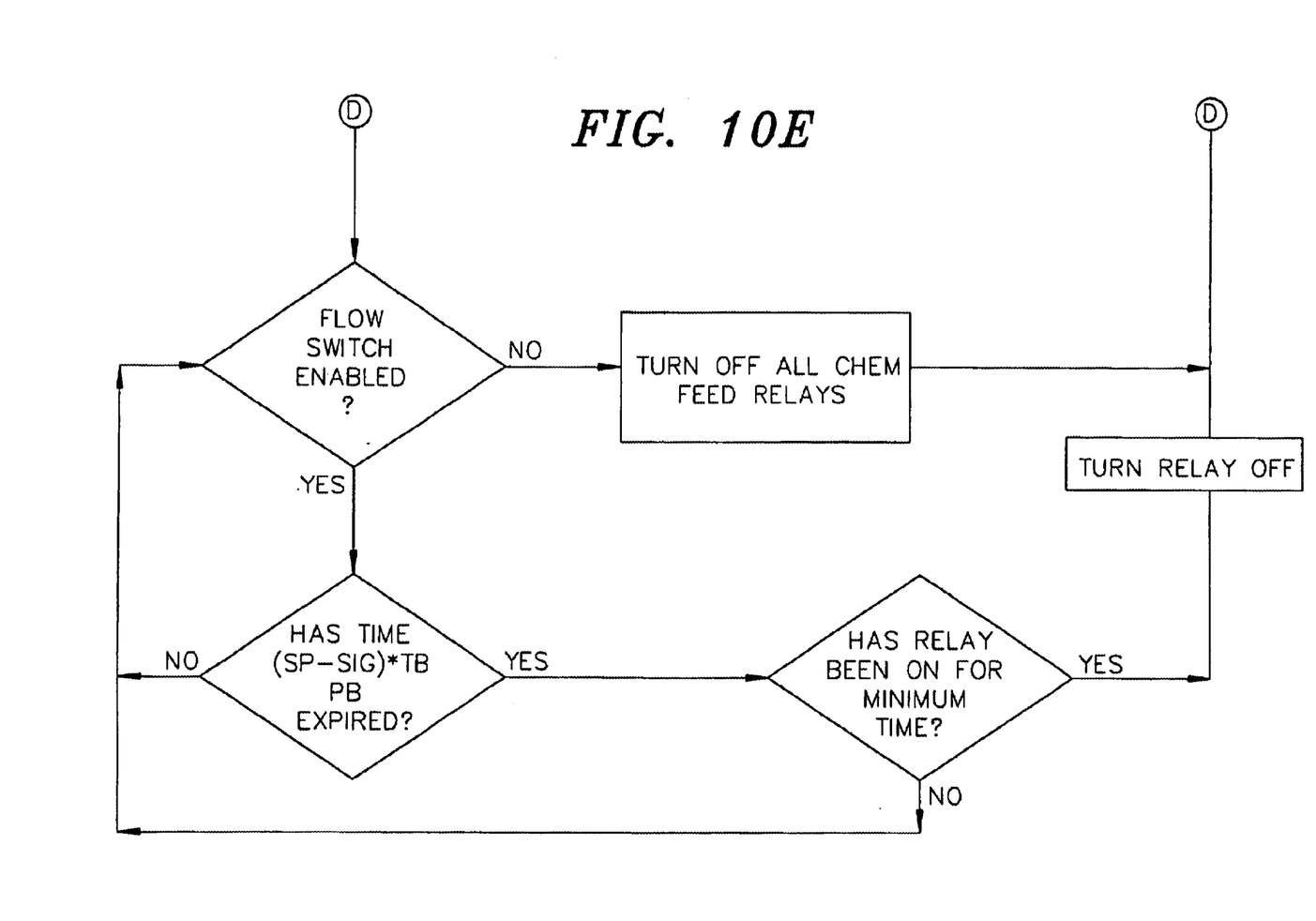

Now referring to FIGS. 9 and 10, the inclusion of integration logic within the standard proportional logic feed up is exemplified. FIG. 9 is illustrative of a feed up example utilizing timed base proportional logic, absent selected time duration response logic. FIG. 10, specifically the area within the block 1010, modifies the prior art proportional logical mode of operation by utilizing a form of deviation compensation, for example by including selected time duration response logic, which may be manifested as integration of a signal, so as to achieve an automatic offset of the time based proportional control function. The signal must first be verified to be residing within the chosen proportional band width, and it must be further confirmed that the signal is within a particular hysteresis value about the desired setpoint. If the signal is found to be outside of the hysteresis value of setpoint, then a determination must be made as to whether the signal falls within the category of being either steady or retreating from the setpoint during the integral time duration. If the determination is affirmative, then a change in the offset is carried out based upon selecting a value, herein termed the "offset sensitivity value" or OS and multiplying it by the value of deviation from setpoint. Inclusion of this subroutine idealizes the time based proportional response.

Ranges of typical values for the calculation of the formulas are as follows:

Proportional Band Width (PB) is typically 30 or 60 mV with an allowable range between about 5 and 500 mV. 0.50 pH units is typical with an adjustable range between about 0.10 and 5.00 pH units. From about 100 to 500 microsiemens is typical with an adjustable range between about 10 and 5000 microsiemens.

Time Base (TB): typically 30 or 60 seconds with an adjustable range between about 15 and 600 seconds Signal (SIG): HRR typical range is 0–1000 mV with an instrument maximum range of –1500 to +1500, pH typical control range of 2–12 pH with an instrument maximum range of 0.00–14.00 pH. Conductivity typical range is 1000–5000 microsiemens with an instrument maximum range of 0–10,000 microsiemens.

Setpoint (SP): HRR is application dependent but is generally within the range of about 150 to 780. The pH will typically be between 2 and 12 pH with the greatest majority of applications (90%) within the 6.00–9.00 pH range. Conductivity setpoints are generally between 1000 and 4000 microsiemens.

Hysteresis values for HRR are 0–10 mV with 0.02 typically used. Hysteresis for pH is typically 0.02 or 0.1 with a range of 0.00–1.1 pH. Conductivity hysteresis is usually 10 but can range from 0–1000.

Offset Sensitivity Value (OS) is a percentage or fractional percentage with a range between 0 and 100%. The Setpoint Offset Value (SOV) is calculated by taking the Sustained Deviation From Setpoint (SD) as a fractional percentage of the Proportional Band (PB) multiplied by the Offset Sensitivity Value (OS) times the Proportional Band, according to the formula:

$$SOV=(SD/PB)*OS*PB$$

Example:
SD=10 mV;
PB=30 mV;
% of PB=0.33;
if Offset Sensitivity Value=1.00 then setpoint offset would change by 0.33*OS*30 or 10 mV. If OS=0.5 then setpoint offset would be 5 mV.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

What is claimed is:

1. A process for time-based proportional control of chemical values in a water treatment system wherein a measured signal value is generated, comprising the steps:

selecting an offset sensitivity value; and calculating a setpoint offset value (SOV) to determine said measured signal value;

wherein said measured signal value approximates an ideal proportional control response, and wherein said setpoint offset value is calculated according to the formula $$SOV=(SD/PB)*OS*PB$$

where SD equals the sustained deviation from setpoint, PB equals Proportional Band Width, and OS equals Offset Sensitivity Value.

2. In a process for time-based proportional control of chemical values in a water treatment system wherein a measured signal value is generated, the improvement comprising:

modifying said measured signal value to be within a range defined by a particular proportional band width;

verifying that said signal value likes within a hysteresis value about a particularly defined setpoint;

measuring said signal value to confirm that said signal value is steady or retreating from said setpoint during a selected time duration;

selecting an offset sensitivity value; and calculating a setpoint offset value (SOV) according to the formula $$SOV=(SD/PB)*OS*PB$$

where
   SD equals the sustained deviation from setpoint
   PB equals Proportional Band Width
   OS equals Offset Sensitivity Value;

wherein said measured signal value approximates an ideal proportional control response.

3. A process in accordance with claim 2 wherein:
   said particular proportional band width is between about 5 and 500 mV.

4. A process in accordance with claim 2 wherein:
   said particular proportional band width is between about 0.1 and 5.0 pH units.

5. A process in accordance with claim 2 wherein:
   said particular proportional band width is between about 10 and 5000 microsiemens.

6. A process in accordance with claim 2 wherein:
   said time base is between about 15 and 600 seconds.

7. A process in accordance with claim 2 wherein:
   said selected time duration is a multiple of the time base.

8. A process in accordance with claim 2 wherein:
   said hysteresis value is between about 0 and 10 mV.

9. A process in accordance with claim 2 wherein:
   said hysteresis value is between about 0 and 1.0 pH units.

10. A process in accordance with claim 2 wherein:
    said particular proportional band width is between about 0 and 1000 microsiemens.

11. A process in accordance with claim 2 wherein said setpoint is between about 150 and 780 mV.

12. A process in accordance with claim 2 wherein:
    said setpoint is between about 2 and 12 pH units.

13. A process in accordance with claim 2 wherein:
    said setpoint is between about 1000 and 4000 microsiemens.

14. A process in accordance with claim 2 wherein:
    said offset sensitivity value is within the range of about 0 and 100 percent.

* * * * *